US012254709B2

United States Patent
Bordone Molini et al.

(10) Patent No.: US 12,254,709 B2
(45) Date of Patent: Mar. 18, 2025

(54) USING IMAGE PROCESSING TO IDENTIFY PRODUCE

(71) Applicant: ZEBRA TECHNOLOGIES CORPORATION, Lincolnshire, IL (US)

(72) Inventors: Andrea Bordone Molini, London (GB); Francesco Lupo, London (GB); Andrea Mirabile, London (GB)

(73) Assignee: Zebra Technologies Corporation, Lincolnshire, IL (US)

( * ) Notice: Subject to any disclaimer, the term of this patent is extended or adjusted under 35 U.S.C. 154(b) by 335 days.

(21) Appl. No.: 17/683,134

(22) Filed: Feb. 28, 2022

(65) Prior Publication Data

US 2023/0274560 A1    Aug. 31, 2023

(51) Int. Cl.
| | |
|---|---|
| G06V 20/68 | (2022.01) |
| G06Q 20/20 | (2012.01) |
| G06V 10/20 | (2022.01) |
| G06V 10/764 | (2022.01) |
| G06V 10/82 | (2022.01) |

(52) U.S. Cl.
CPC ......... *G06V 20/68* (2022.01); *G06Q 20/208* (2013.01); *G06V 10/255* (2022.01); *G06V 10/764* (2022.01); *G06V 10/82* (2022.01)

(58) Field of Classification Search
CPC .... G06V 20/68; G06V 10/255; G06V 10/764; G06V 10/82; G06V 10/25; G06Q 20/208; G06Q 30/0631; G06F 16/532; G07G 1/0072; G07G 1/0054; G07G 1/0063
See application file for complete search history.

(56) References Cited

U.S. PATENT DOCUMENTS

| | | | | |
|---|---|---|---|---|
| 11,538,262 | B2 * | 12/2022 | Barkan ............... | G06V 10/443 |
| 11,727,229 | B1 * | 8/2023 | Lupo ................... | G06K 7/1443 |
| | | | | 235/462.14 |
| 11,922,268 | B1 * | 3/2024 | Lupo ................... | G06K 7/1413 |
| 11,948,119 | B2 * | 4/2024 | Luecht ................. | G06V 10/23 |
| 2018/0108137 | A1 * | 4/2018 | Price ................... | G06N 3/045 |
| 2019/0108396 | A1 * | 4/2019 | Dal Mutto ........... | G06V 20/52 |

(Continued)

OTHER PUBLICATIONS

International Search Report and Written Opinion for International Application No. PCT/US2023/13947 mailed on Jun. 7, 2023.

*Primary Examiner* — Andrae S Allison (57) ABSTRACT

A controller using image processing to identify produce is disclosed herein. The controller may include one or more memories and one or more processors communicatively coupled to the one or more memories. In some implementations, a controller may receive a trigger associated with presence of an item at a product processing zone. The controller may capture, via an imager, an image representing the item. Accordingly, the controller may apply a first convolutional neural network (CNN) to the image to determine a bounding box associated with the item. The controller may determine that the item within the bounding box satisfies an occlusion threshold and may apply a second CNN to the image to determine a query image representation. Accordingly, the controller may receive, from a database, an indication of one or more candidate items based on the query image representation and indicate, via a user interface, the candidate item(s).

20 Claims, 9 Drawing Sheets

(56) References Cited

U.S. PATENT DOCUMENTS

| | | | |
|---|---|---|---|
| 2020/0234394 A1 | 7/2020 | Calhoon et al. | |
| 2023/0169441 A1* | 6/2023 | Luecht | G06Q 10/08 |
| | | | 705/28 |
| 2023/0252343 A1* | 8/2023 | McDaniel | G06K 7/1413 |
| | | | 706/12 |
| 2023/0267685 A1* | 8/2023 | Bay | G06Q 30/0282 |
| | | | 345/423 |

* cited by examiner

USING IMAGE PROCESSING TO IDENTIFY PRODUCE

BACKGROUND

At a product processing station, a barcode reader may scan and identify items. However, some items, such as produce, do not include barcodes. Accordingly, identifying produce at the product processing station often relies on text-based queries to display candidate items from which a user may select. This process can have a lot of latency. Additionally, a display of the product processing station may consume large amounts of power and processing resources showing numerous pages of results to the text-based queries. Therefore, there is a need to reduce latency and conserve power and processing resources at the product processing station when identifying produce.

SUMMARY

Some implementations described herein relate to a method for identifying produce using image analysis. The method may include receiving, at a controller, a trigger associated with presence of an item at a product processing zone. The method may include capturing, via an imager having a field of view (FOV) extending at least partially over the product processing zone, an image representing the item. The method may include applying a first convolutional neural network (CNN) to the image to determine a bounding box associated with the item. The method may include determining that the item within the bounding box satisfies an occlusion threshold. The method may include applying a second CNN to the image to determine a query image representation. The method may include receiving, from a database, an indication of one or more candidate items based on the query image representation. The method may include indicating, via a user interface, the one or more candidate items to a user.

Some implementations described herein relate to a device for identifying produce using image analysis. The device may include one or more memories and one or more processors communicatively coupled to the one or more memories. The one or more processors may be configured to receive, at the device, a trigger associated with presence of an item at a product processing zone. The one or more processors may be configured to capture, via an imager having an FOV extending at least partially over the product processing zone, an image representing the item. The one or more processors may be configured to apply a first CNN to the image to determine a bounding box associated with the item. The one or more processors may be configured to determine that the item within the bounding box satisfies an occlusion threshold. The one or more processors may be configured to apply a second CNN to the image to determine a query image representation. The one or more processors may be configured to receive, from a database, an indication of one or more candidate items based on the query image representation. The one or more processors may be configured to indicate, via a user interface, the one or more candidate items to a user.

Some implementations described herein relate to a tangible machine-readable medium that stores a set of instructions for a device. The set of instructions, when executed by one or more processors of the device, may cause the device to receive, at the device, a trigger associated with presence of an item at a product processing zone. The set of instructions, when executed by one or more processors of the device, may cause the device to capture, via an imager having an FOV extending at least partially over the product processing zone, an image representing the item. The set of instructions, when executed by one or more processors of the device, may cause the device to apply a first CNN to the image to determine a bounding box associated with the item. The set of instructions, when executed by one or more processors of the device, may cause the device to determine that the item within the bounding box satisfies an occlusion threshold. The set of instructions, when executed by one or more processors of the device, may cause the device to apply a second CNN to the image to determine a query image representation. The set of instructions, when executed by one or more processors of the device, may cause the device to receive, from a database, an indication of one or more candidate items based on the query image representation. The set of instructions, when executed by one or more processors of the device, may cause the device to indicate, via a user interface, the one or more candidate items to a user.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate implementations of concepts disclosed herein, and explain various principles and advantages of those implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations described herein.

The apparatus and method elements have been represented where appropriate by conventional symbols in the drawings, showing only those specific details that are pertinent to understanding the implementations described herein so as not to obscure the disclosure with details that will be readily apparent to those of ordinary skill in the art having the benefit of the description herein.

DETAILED DESCRIPTION

The following detailed description of example implementations refers to the accompanying drawings. The same reference numbers in different drawings may identify the same or similar elements.

At a product processing station, a barcode reader may scan and identify items. However, some items, such as produce, do not include barcodes. Accordingly, identifying produce at the product processing station often relies on text-based queries to display candidate items from which a user may select. However, text-based queries are time-consuming to receive and process.

Additionally, text-based queries may depend on multiple queries to a database storing product descriptions, which consumes power and processing resources. Furthermore, a display of the product processing station may consume large amounts of power and processing resources showing numerous pages of results to the text-based queries.

Using image analysis to identify produce reduces a quantity of queries to a database storing feature vectors associated with items and reduces power and processing resources consumed by a display in showing irrelevant results. Some implementations described herein enable a convolutional neural network (CNN) to generate a query image representation and obtain candidate items based on reference feature vectors associated with the candidate items. As a result, accuracy is increased as compared with text-based queries. Some implementations described herein further use a CNN to generate a bounding box and determine whether produce is occluded. As a result, processing resources and power are conserved because occluded images are not used to generate less accurate candidate items.

Figure 1A:
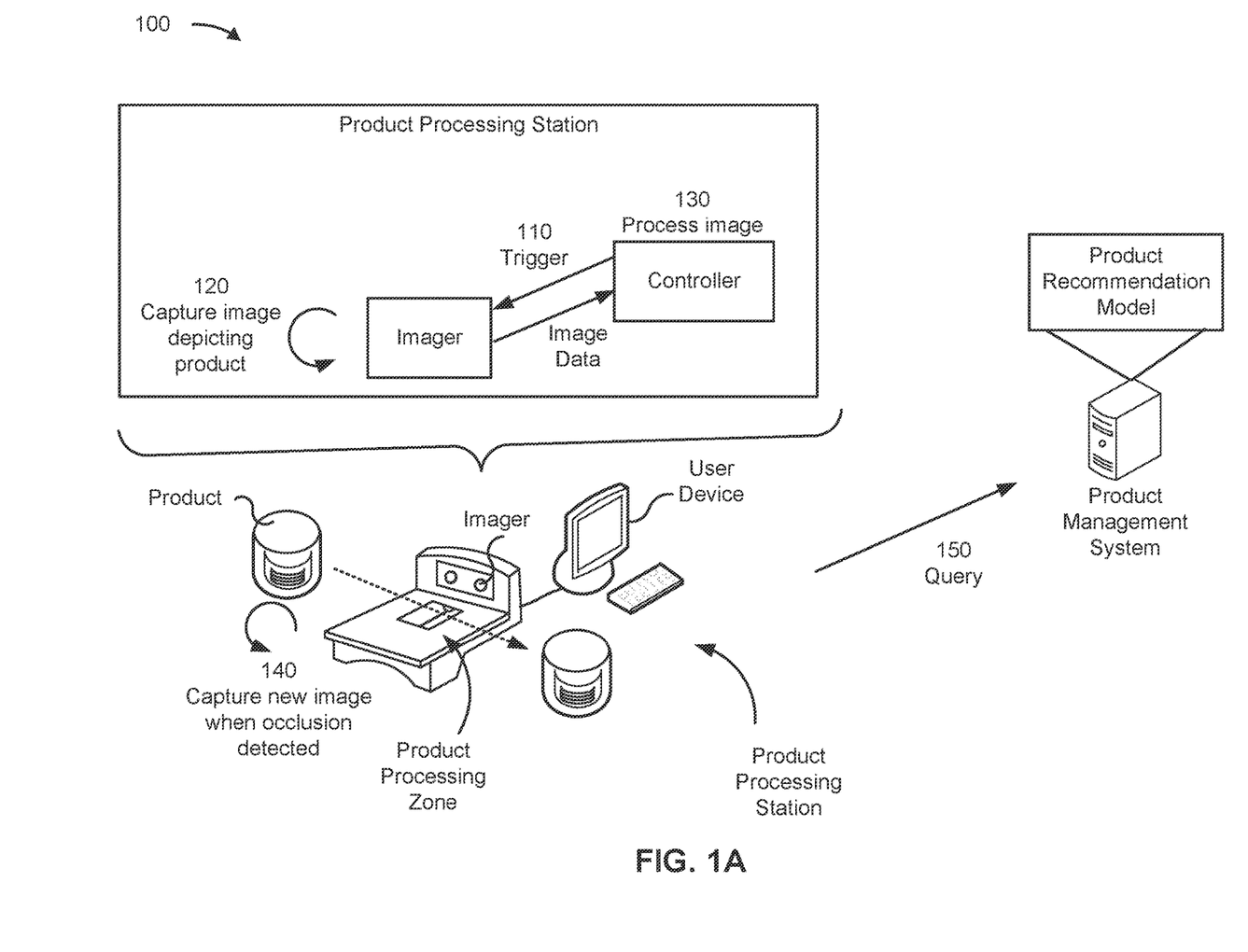
FIGS. 1A-1B are diagrams of an example implementation described herein.
Figure 1B:
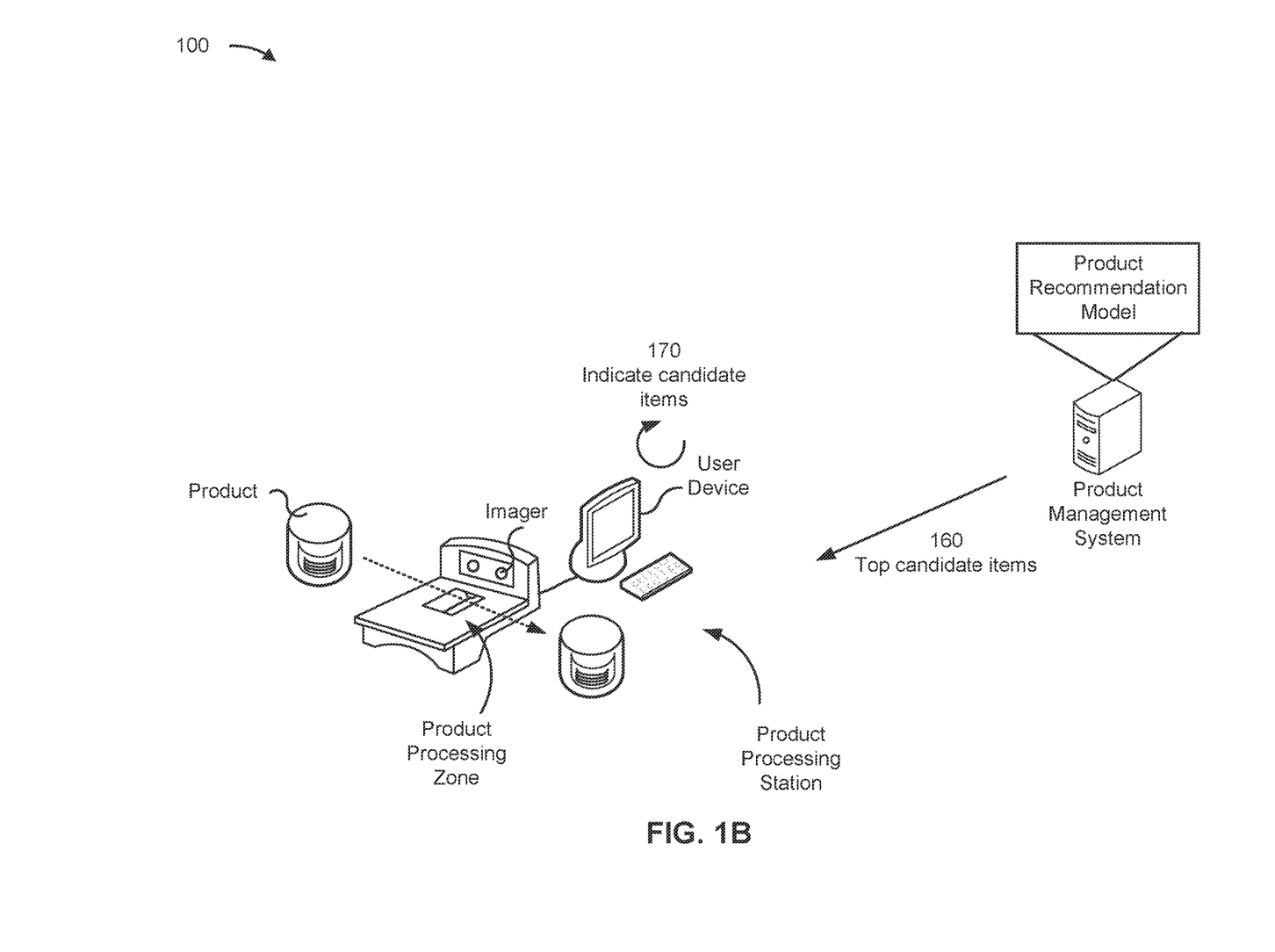

FIGS. 1A-1B are diagrams of an example implementation 100 associated with identifying produce using image analysis. As shown in FIGS. 1A-1B, example implementation 100 includes a product processing station and a product management system. These devices are described in more detail below in connection with FIG. 4 and FIG. 5.

In example implementation 100, the product processing station includes a barcode reader and an imager (e.g., a camera or other type of imaging device). The barcode reader may include a manually controlled device that is configured to be held by and/or attached to a user and triggered (e.g., using a button or other input device) by the user to scan barcodes. Additionally, or alternatively, the barcode reader may include an automatically controlled device that can continuously monitor a physical environment of the barcode reader, detect when a barcode is placed within a field of view of the barcode scanner, and automatically scan the detected barcodes. While certain examples are described herein in connection with a barcode reader analyzing a barcode associated with a product, such examples may similarly apply to utilizing a radio frequency identification (RFID) reader that is configured to read an RFID tag associated with the product. For example, the product processing station may include an RFID reader that is configured to identify and/or obtain product information associated with a product based on an RFID tag that is attached to the product and/or packaging of the product.

The imager may include any suitable imager that is capable of capturing an image of packaging of a product, as described herein. The imager may be configured to capture the image based on receiving an instruction from the product processing station, the barcode reader, a user, and/or any suitable device. The imager may have a field of view (FOV) extending at least partially over a product processing zone of the product processing station. The product processing zone includes a volume of space adjacent or otherwise abutting the product processing station.

The product management system may implement a product recommendation model described herein. In some implementations, as described in connection with FIG. 3A, the product processing station may implement, at least in part, the product recommendation model. Alternatively, as described in connection with FIG. 3B, a cloud environment may implement, at least in part, the product recommendation model.

As further shown in FIGS. 1A-1B, the product processing station further includes a user device and a controller (e.g., a microcontroller or other type of processor). The user device may include an output component (e.g., a speaker, a display, and/or another component that indicates information to the user based on analog and/or digital signals) and an input component (e.g., a touchscreen, a keyboard, and/or another component that generates analog and/or digital representations of input from the user). The controller may include any suitable processor that is capable of transmitting commands to, and receiving information from, the imager, the user device, and the product management system, as described herein. The controller may execute an operating system (e.g., a Windows-based system, a Unix-based system, and/or another type of operating system) and one or more applications (e.g., with which the user interacts at the product processing station) thereon.

As shown in FIG. 1A and by reference number 110, the controller may trigger the imager to capture an image representing an item in the product processing zone. For example, the controller may transmit a command to the imager to capture an image of at least a portion of an environment of the product processing station. Alternatively, the imager may operate continuously (or at least semi-continuously, for example, during a preconfigured period of time and/or in response to an initial starting trigger, such as activation of the product processing station). Accordingly, the controller may transmit a request for the imager to provide a next-captured image of at least a portion of an environment of the product processing station to the controller. As shown in FIG. 1A, the item may be a product that is associated with the product management system.

In some implementations, the trigger may be based on information from a scale (e.g., included in the product processing station), as described in connection with FIG. 2A. Additionally, or alternatively, the trigger may be based on input from the user device, as described in connection with FIG. 2B.

Accordingly, as shown by reference number 120, the imager may capture an image including the item and provide the image to the controller. The imager may use an analog-to-digital converter (ADC) and generate an image file or other digital representation of the image to transmit to the controller. Alternatively, the imager may provide analog data from a plurality of pixels to the controller such that the controller uses an ADC to generate the image file or other digital representation of the image.

As shown by reference number 130, the controller may process the image to generate a query image representation associated with the item. For example, the controller may process the image using at least a first CNN and a second CNN, as described in connection with FIG. 3A. Alternatively, the controller may transmit the image to a cloud environment for processing using at least a first CNN and a second CNN, as described in connection with FIG. 3B. Alternatively, the controller may transmit the image to the product management system for processing using at least a first CNN and a second CNN.

In some implementations, and as shown by reference number 140, the imager may capture a new image when the original image fails to satisfy an occlusion threshold. For example, as described in connection with FIGS. 3A and 3B, the first CNN (or an additional CNN) may detect at least a portion of a hand, a bag, a receipt, or another object that at least partially occludes the product in the image. When the image satisfies the occlusion threshold, image processing may continue. When the image fails to satisfy the occlusion threshold, the controller may repeat operations described in connection with reference numbers 120 and 130. In some implementations, the controller may iteratively perform the operations until an image is captured that satisfies the occlusion threshold and/or until a quantity of iterations satisfies an iteration threshold. For example, the controller may fall back to using text-based queries when the quantity of iterations satisfies the iteration threshold.

As shown by reference number 150, the controller may transmit, and the product management system may receive, the query image representation associated with the item. Furthermore, as shown in FIG. 1B and by reference number 160, the controller may receive an indication of one or more candidate items based on the query image representation. For example, the product management system may manage a database (or other similar data structure) of items (e.g., stored as descriptor strings, universal product codes (UPCs), and/or other product indicators) with reference feature vectors associated with the items. As described in connection with FIGS. 3A-3B, the query image representation may be a feature vector associated with the image.

Accordingly, in some implementations, the product management system may select the candidate item(s) based on a set of reference feature vectors and the query image representation. For example, the product management system may calculate a distance between each reference feature vector and the query image representation and rank candidate items based on corresponding distances associated with the corresponding reference feature vectors for the candidate items. Accordingly, the product management system may output the top K candidate items to the controller (e.g., where K represents a positive integer). By comparing the query image representation to each reference feature vector, the product management system improves an accuracy of the candidate items, which further conserves power and processing resources when the user does not have to go through multiple pages of results to find the matching one of the candidate items. Additionally, a candidate item may be associated with more than one reference feature vector, such that the product management system ranks the candidate item by a reference feature vector closest to the query image representation. As a result, the product management system ranks the candidate items more accurately by using all reference feature vectors associated with each candidate item.

Alternatively, the product management system may select the candidate item(s) using a linear classifier trained on the set of reference feature vectors. For example, the linear classifier may comprise a single layer of artificial neurons configured to output the top K candidate items. As a result, the product management system may determine the candidate item(s) quickly by using the linear classifier.

In a combinatory example, the product management system may use the linear classifier to identify the top N candidate items (e.g., where N represents a positive integer) and use distances between the reference feature vectors associated with the top N candidate items and the query image representation to determine the top K candidate items (where N>K). As a result, the product management system increases accuracy while still conserving processing resources.

Although described in connection with the product management system processing the query, the controller and/or the product management system may transmit the query image representation to an external information source (e.g., as described in connection with FIG. 4) for processing the query against a database of items.

Thus, as shown by reference number 170, the controller may indicate via a user interface (e.g., a display or other output component of the user device) the one or more candidate items to the user. For example, the controller may generate instructions (e.g., for a driver associated with a display) to show product descriptors and/or images associated with the candidate item(s) received from the product management system. In another example, the controller may generate instructions (e.g., for a driver associated with a speaker) to play audio of product descriptors associated with the candidate item(s) received from the product management system.

In some implementations, the controller may further receive input associated with a selected item of the one or more candidate items. For example, the user device may receive input from the user selecting one of the candidate items and generate a signal associated with the selected item. Accordingly, the controller may cause a transaction to be processed using the selected item. For example, the controller may add the selected item to an invoice associated with an ongoing transaction. In some implementations, the controller may receive information from a scale of the product processing station (e.g., a weight associated with the selected item) such that the transaction is processed based on the selected item and the information from the scale.

By using techniques as described in connection with FIGS. 1A-1B, the product management system obtains candidate items based on reference feature vectors associated with the candidate items. As a result, accuracy of the displayed candidate items is increased as compared with text-based queries, which then reduces power consumption and processing resources used at the user device of the product processing station.

As indicated above, FIGS. 1A-1B are provided as an example. Other examples may differ from what is described with regard to FIGS. 1A-1B. The number and arrangement of devices shown in FIGS. 1A-1B are provided as an example. In practice, there may be additional devices, fewer devices, different devices, or differently arranged devices than those shown in FIGS. 1A-1B. Furthermore, two or more devices shown in FIGS. 1A-1B may be implemented within a single device, or a single device shown in FIGS. 1A-1B may be implemented as multiple, distributed devices. Additionally, or alternatively, a set of devices (e.g., one or more devices) shown in FIGS. 1A-1B may perform one or more functions described as being performed by another set of devices shown in FIGS. 1A-1B.

Figure 2A:
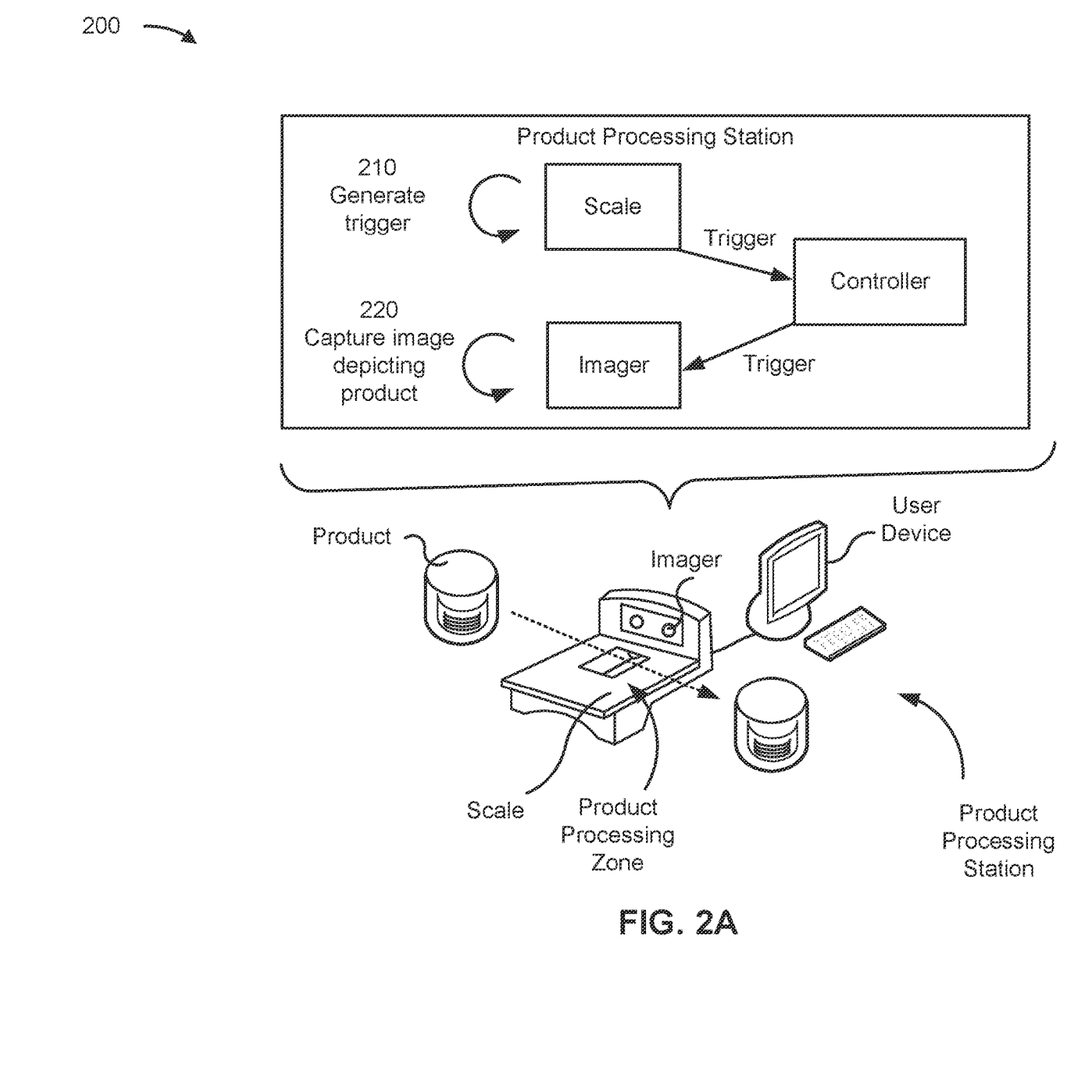
FIGS. 2A-2B are diagrams of another example implementation described herein.
Figure 2B:
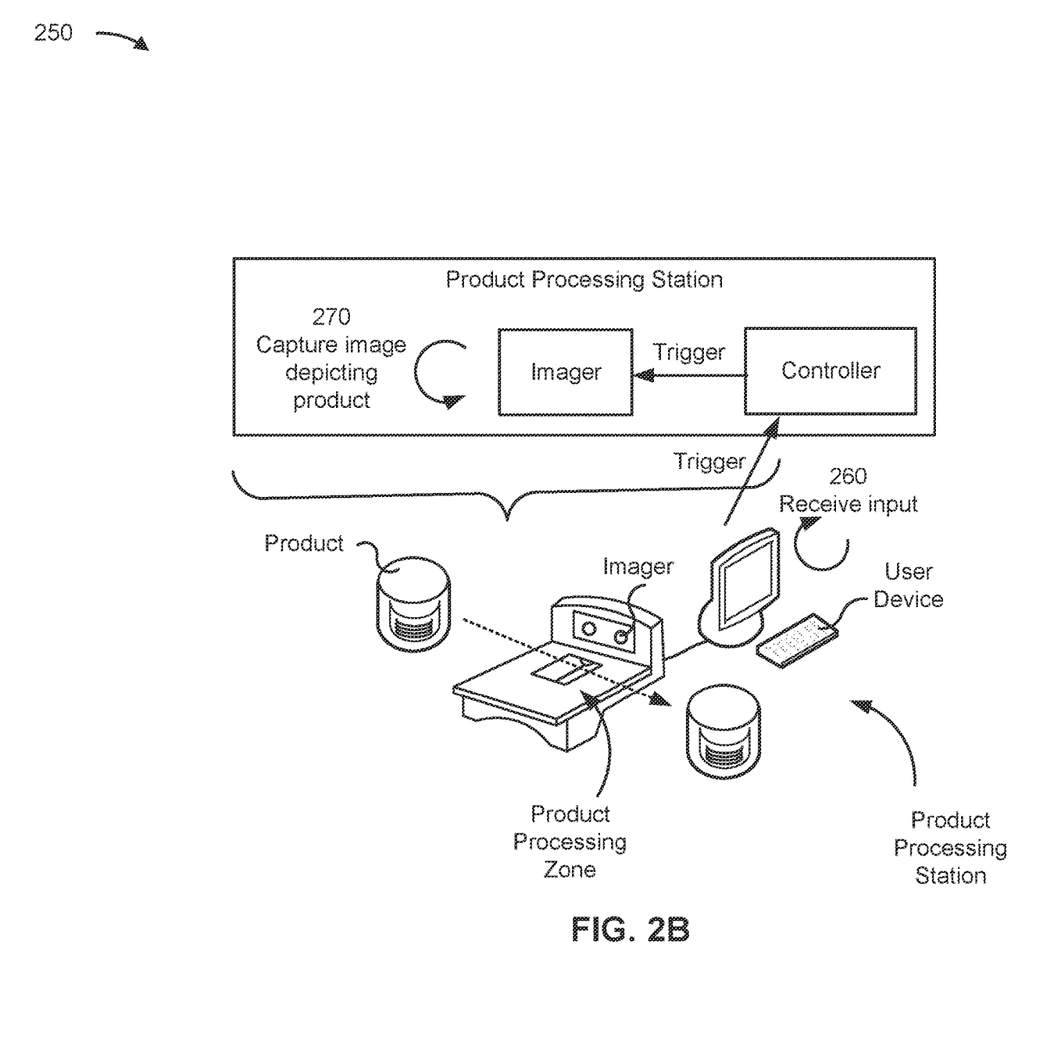

FIGS. 2A and 2B are diagrams of example implementations 200 and 250, respectively, associated with triggering identification of produce using image analysis. Example implementations 200 and 250 each include a product processing station, as described in connection with FIGS. 1A-1B. This device is also described in more detail below in connection with FIG. 4 and FIG. 5.

As shown in FIG. 2A, example implementation 200 further includes a scale. The scale may include any sensor that is capable of measuring a weight of an item in a product processing zone, as described herein. The scale may be configured to capture measurements based on receiving an instruction from the product processing station, the barcode reader, a user, and/or any suitable device.

As shown by reference number 210, the scale may generate a trigger based on a measurement at the scale satisfying a weight threshold. For example, the controller may transmit a command to the scale to measure a weight and determine whether the measurement satisfies the weight threshold. Alternatively, the scale may operate continuously (or at least semi-continuously, for example, during a preconfigured period of time and/or in response to an initial starting trigger, such as activation of the product processing station). Accordingly, the controller may transmit a request for the scale to provide a current measurement for checking against the weight threshold.

Accordingly, based on receiving the trigger from the scale, the controller may trigger the imager to capture an image representing an item at the product processing zone, as shown by reference number 220. For example, the imager may capture the image as described in connection with reference number 110 of FIG. 1A. Accordingly, the controller may perform operations described in connection with FIGS. 1A-1B using the image.

Additionally, or alternatively, as shown in FIG. 2B and by reference number 260, a user interface (e.g., a touchscreen or other input component of the user device) may receive input from a user. For example, a user may interact with a button or other portion of a graphical user interface (GUI) that indicates a desire to identify produce. Alternatively, the user may speak or otherwise provide a voice command to identify produce. Accordingly, based on receiving input from the user interface, the controller may trigger the imager to capture an image representing an item at the product processing zone, as shown by reference number 270. For example, the imager may capture the image as described in connection with reference number 110 of FIG. 1A. Accordingly, the controller may perform operations described in connection with FIGS. 1A-1B using the image.

As indicated above, FIGS. 2A-2B are provided as examples. Other examples may differ from what is described with regard to FIGS. 2A-2B.

Figure 3A:
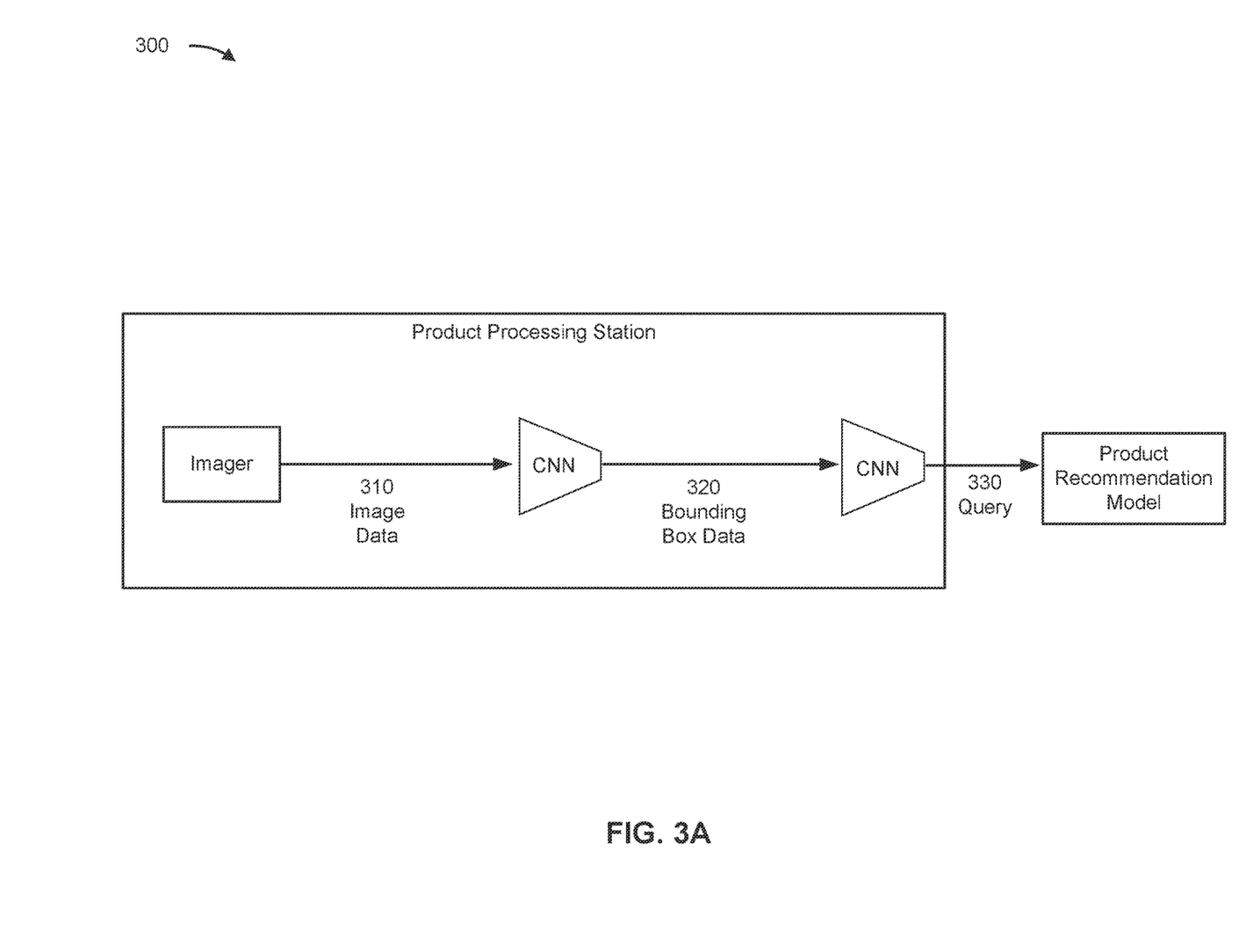
FIGS. 3A-3B are diagrams of another example implementation described herein.
Figure 3B:
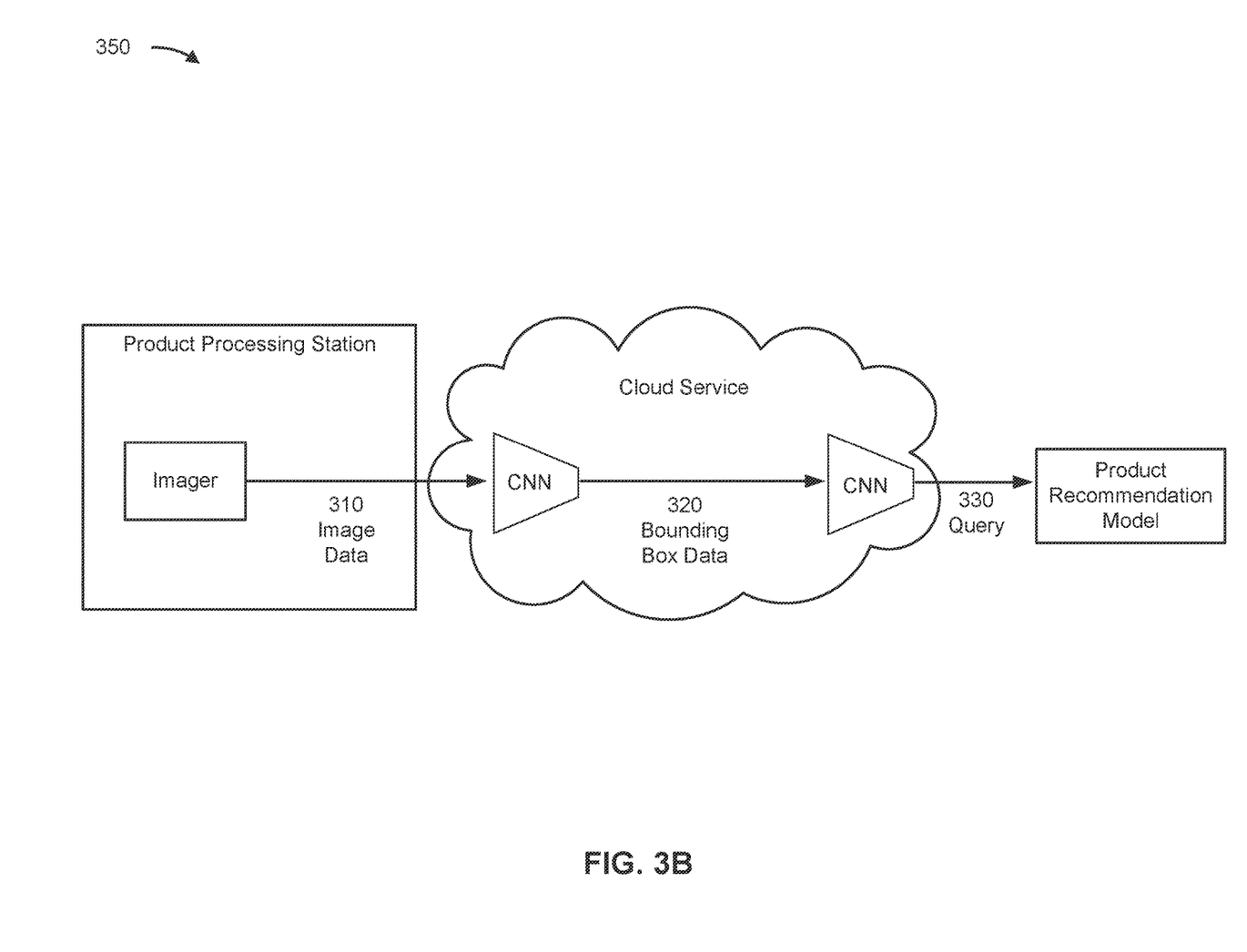

FIGS. 3A and 3B are diagrams of example implementations 300 and 350, respectively, associated with image analysis for identifying produce. Example implementations 300 and 350 each include a product processing station and a product recommendation model (e.g., implemented at a product management system), as described in connection with FIGS. 1A-1B. These devices are also described in more detail below in connection with FIG. 4 and FIG. 5.

As further shown in FIGS. 3A and 3B, an image of an item (e.g., produce) may be processed using at least a first CNN and a second CNN of the product recommendation model. Other implementations may use similar neural networks (e.g., other feedforward neural networks and/or recurrent neural networks (RNNs)) to identify the item. As shown in FIG. 3A and by reference number 310, the imager may transmit (e.g., via the controller and/or the product management system) the image including the item to the first CNN. In example implementation 300, the first CNN is implemented on the product processing station, but in other implementations, the first CNN may be implemented on the product management system.

Accordingly, the first CNN may be applied to the image to determine a bounding box associated with the item. For example, the first CNN may be trained on a training set of images to identify the item (e.g., produce) within an input image and to calculate the bounding box associated with the identified item. Accordingly, the bounding box may include a plurality of pixels in which the first CNN estimates that the item is represented. The bounding box may be represented using pixel coordinates, real coordinates, and/or a geographic shape (such as a rectangle).

In some implementations, the first CNN and/or an additional CNN may determine an additional bounding box associated with an occlusion in the image. For example, the additional bounding box may be associated with a hand, a bag, and/or another object that at least partially obscures the item in the image. Accordingly, the first CNN may be further trained on an additional training set of images to identify the occlusion (e.g., a hand or a bag) within an input image and to calculate the additional bounding box associated with the identified occlusion. Alternatively, the additional CNN may be trained on a training set of images to identify the occlusion (e.g., a hand or a bag) within an input image and to calculate a bounding box associated with the identified occlusion.

As a result, the image may be discarded when the item within the bounding box does not satisfy an occlusion threshold. For example, when an overlap between the bounding box (associated with the item) and the additional bounding box (associated with the occlusion) fails to satisfy the occlusion threshold (e.g., the overlap is more than 50%, more than 75%, more than 80%, among other examples), the product processing station may discard the image and capture a new image (e.g., as described in connection with reference number 140 of FIG. 1A).

On the other hand, image processing may proceed when the item within the bounding box satisfies the occlusion threshold. Accordingly, as shown by reference number 320, the first CNN may feed the image and the bounding box to a second CNN. Accordingly, the second CNN may be applied to the image to determine a feature vector associated with the image. In some implementations, to further increase accuracy, the image may be cropped using the bounding box before the cropped image is fed to the second CNN.

Therefore, as shown by reference number 330, the second CNN generates a feature vector that functions as the query image representation. In some implementations, dimensions of the query image representation may be normalized before transmission to the product recommendation model. For example, dimensions of the feature vector may depend on a size of an input image such that the query image representation has different dimensions depending on a size of the cropped image, as described above. Accordingly, to increase accuracy, the query image representation may be normalized (e.g., with padding, such as zeroes and/or ones, and/or with extrapolated values).

As shown in FIG. 3B, example implementation 350 further includes a cloud environment, which may be provided by a cloud service as described in more detail below in connection with FIG. 4 and FIG. 5. Accordingly, the imager may transmit (e.g., via the controller and/or the product management system) the image including the item to the cloud service for processing using the first CNN (e.g., via an application programming interface (API) that accepts the image as a parameter). As further shown in FIG. 3B, the cloud service may provide output from the first CNN to the second CNN. In other implementations, the cloud service may return the output from the first CNN to the controller (and/or the product management system) such that the controller (and/or the product management system) may transmit the image and the bounding box (or the cropped image based on the bounding box) to the cloud service for processing using the second CNN (e.g., via an API that accepts the image and the bounding box, or the cropped image, as a parameter).

Accordingly, as shown in FIG. 3B, the cloud service may provide the query image representation to the product recommendation model. Alternatively, the cloud service may return the output from the second CNN to the controller (and/or the product management system) such that the controller (and/or the product management system) may transmit the query image representation to the product recommendation model.

As indicated above, FIGS. 3A-3B are provided as examples. Other examples may differ from what is described with regard to FIGS. 3A-3B.

Figure 4:
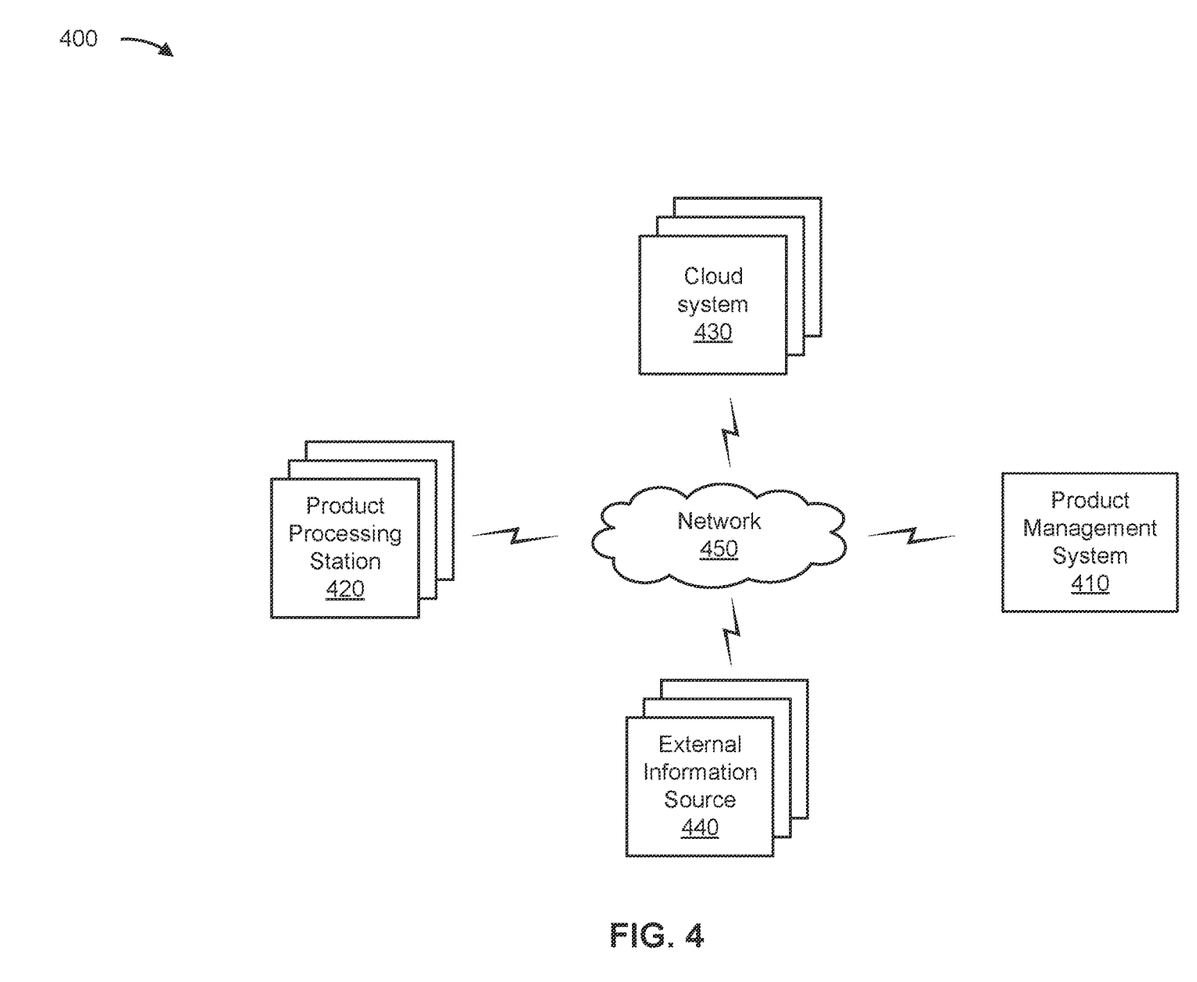
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a product management system 410, one or more product processing stations 420, one or more cloud systems 430, one or more external information sources 440, and a network 450. Devices of environment 400 may interconnect via wired connections, wireless connections, or a combination of wired and wireless connections.

The product management system 410 includes one or more devices capable of receiving, generating, storing, processing, providing, and/or routing information associated with items and/or a data structure used to identify candidate items based on query representations, as described elsewhere herein. The product management system 410 may include a communication device and/or a computing device. For example, the product management system 410 may include a server, such as an application server, a client server, a web server, a database server, a host server, a proxy server, a virtual server (e.g., executing on computing hardware), or a server in a cloud computing system. In some implementations, the product management system 410 includes computing hardware used in a cloud computing environment.

The product processing station 420 includes one or more devices capable of receiving, generating, storing, processing, and/or providing information associated with recognizing items based on feature vectors, as described elsewhere herein. The product processing station 420 may include a communication device and/or a computing device. For example, the product processing station 420 may include a wireless communication device, a user device (e.g., a mobile phone, a user equipment, a laptop computer, a tablet computer, a desktop computer), an imager, a barcode reader, an RFID reader, a point-of-sale terminal, or a similar type of device.

The cloud system 430 includes one or more devices capable of receiving, generating, storing, processing, and/or providing information associated with identifying candidate items based on query representations, as described elsewhere herein. The cloud system 430 may include a communication device and/or a computing device. For example, the cloud system 430 may include a server, such as an application server, a client server, a web server, a database server, a host server, a proxy server, a virtual server (e.g., executing on computing hardware), or a server in a cloud computing system. Accordingly, the cloud system 430 may implement a cloud environment (e.g., for one or more CNNs, as described herein). In some implementations, the cloud system 430 is at least partially integrated (e.g., physically, logically, and/or virtually) with the product management system 410. Alternatively, the cloud system 430 may be separate from the product management system 410.

The external information source 440 includes one or more devices capable of receiving, generating, storing, processing, and/or providing information associated with items, as described elsewhere herein. The external information source 440 may include a communication device and/or a computing device. For example, the external information source 440 may include a database, a server, a database server, an application server, a client server, a web server, a host server, a proxy server, a virtual server (e.g., executing on computing hardware), an online marketplace server, a server in a cloud computing system, a device that includes computing hardware used in a cloud computing environment, or a similar type of device. The external information source 440 may communicate with one or more other devices of environment 400, as described elsewhere herein.

The network 450 includes one or more wired and/or wireless networks. For example, the network 450 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 450 enables communication among the devices of environment 400.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
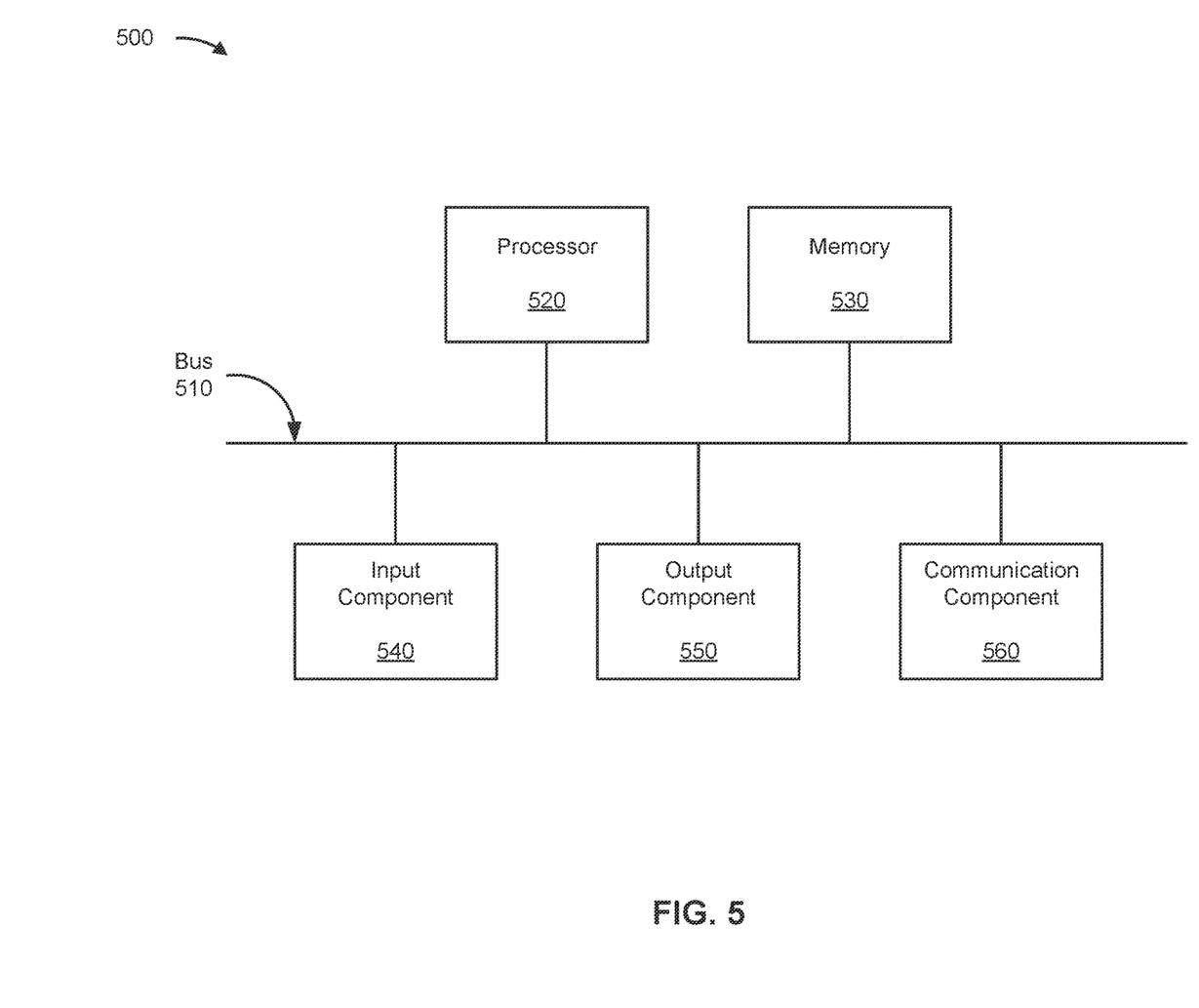
FIG. 5 is a diagram of example components of one or more devices of FIG. 4.

FIG. 5 is a diagram of example components of a device 500, which may correspond to a product management system, a product processing station, a cloud system, and/or an external information source. In some implementations, a product management system, a product processing station, a cloud system, and/or an external information source may include one or more devices 500 and/or one or more components of device 500. As shown in FIG. 5, device 500 may include a bus 510, a processor 520, a memory 530, an input component 540, an output component 550, and a communication component 560.

Bus 510 includes one or more components that enable wired and/or wireless communication among the components of device 500. Bus 510 may couple together two or more components of FIG. 5, such as via operative coupling, communicative coupling, electronic coupling, and/or electric coupling. Processor 520 includes a central processing unit, a graphics processing unit, a microprocessor, a controller, a microcontroller, a digital signal processor, a field-programmable gate array, an application-specific integrated circuit, and/or another type of processing component. Processor 520 is implemented in hardware, firmware, or a combination of hardware and software. In some implementations, processor 520 includes one or more processors capable of being programmed to perform one or more operations or processes described elsewhere herein.

Memory 530 includes volatile and/or nonvolatile memory. For example, memory 530 may include random access memory (RAM), read only memory (ROM), a hard disk drive, and/or another type of memory (e.g., a flash memory, a magnetic memory, and/or an optical memory). Memory 530 may include internal memory (e.g., RAM, ROM, or a hard disk drive) and/or removable memory (e.g., removable via a universal serial bus connection). Memory 530 may be a non-transitory computer-readable medium.

Memory 530 stores information, instructions, and/or software (e.g., one or more software applications) related to the operation of device 500. In some implementations, memory 530 includes one or more memories that are coupled to one or more processors (e.g., processor 520), such as via bus 510.

Input component 540 enables device 500 to receive input, such as user input and/or sensed input. For example, input component 540 may include a touch screen, a keyboard, a keypad, a mouse, a button, a microphone, a switch, a sensor, a global positioning system sensor, an accelerometer, a gyroscope, and/or an actuator. Output component 550 enables device 500 to provide output, such as via a display, a speaker, and/or a light-emitting diode. Communication component 560 enables device 500 to communicate with other devices via a wired connection and/or a wireless connection. For example, communication component 560 may include a receiver, a transmitter, a transceiver, a modem, a network interface card, and/or an antenna.

Device 500 may perform one or more operations or processes described herein. For example, a non-transitory computer-readable medium (e.g., memory 530) may store a set of instructions (e.g., one or more instructions or code) for execution by processor 520. Processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry is used instead of or in combination with the instructions to perform one or more operations or processes described herein. Additionally, or alternatively, processor 520 may be configured to perform one or more operations or processes described herein. Thus, implementations described herein are not limited to any specific combination of hardware circuitry and software.

The number and arrangement of components shown in FIG. 5 are provided as an example. Device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
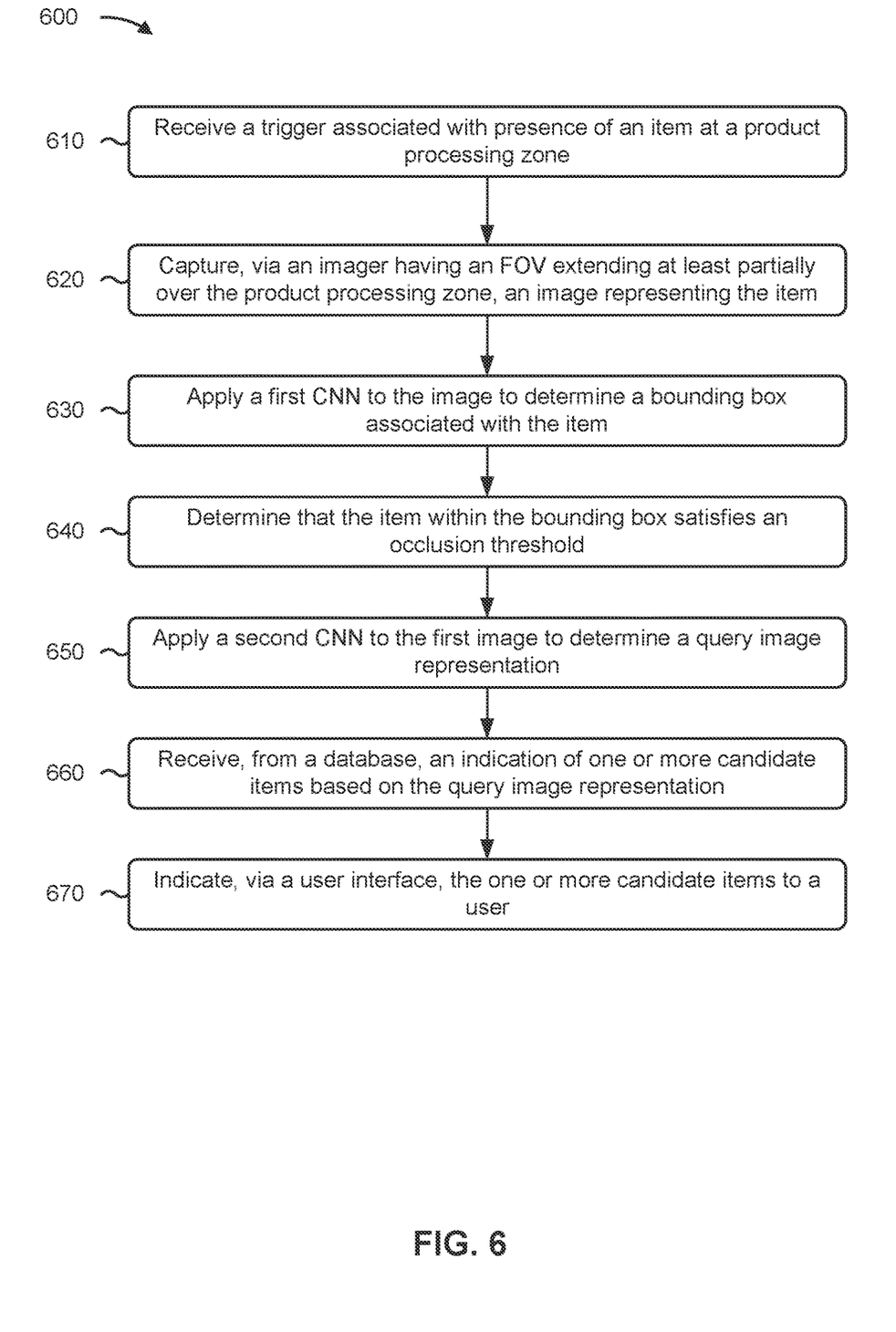
FIG. 6 is a flowchart of an example process relating to identifying produce using image analysis.

FIG. 6 is a flowchart of an example process 600 associated with using image processing to identify produce. In some implementations, one or more process blocks of FIG. 6 may be performed by a controller (e.g., a controller of product processing station 420). In some implementations, one or more process blocks of FIG. 6 may be performed by another device or a group of devices separate from or including the controller, such as the product management system 410, the cloud system 430, and/or the external information source 440. Additionally, or alternatively, one or more process blocks of FIG. 6 may be performed by one or more components of device 500, such as processor 520, memory 530, input component 540, output component 550, and/or communication component 560.

As shown in FIG. 6, process 600 may include receiving a trigger associated with presence of an item at a product processing zone (block 610). For example, the controller may receive a trigger associated with presence of an item at a product processing zone, as described herein. In some implementations, the trigger includes receiving a trigger from a scale based on a measurement at the scale satisfying a weight threshold. Additionally, or alternatively, receiving the trigger includes receiving input from a user interface.

As further shown in FIG. 6, process 600 may include capturing, via an imager having an FOV extending at least partially over the product processing zone, an image representing the item (block 620). For example, the controller may instruct the imager to capture an image representing the item, as described herein.

As further shown in FIG. 6, process 600 may include applying a first CNN to the image to determine a bounding box associated with the item (block 630). For example, the controller may apply a first CNN to the image to determine a bounding box associated with the item, as described herein.

As further shown in FIG. 6, process 600 may include determining that the item within the bounding box satisfies an occlusion threshold (block 640). For example, the controller may determine that the item within the bounding box satisfies an occlusion threshold, as described herein. In one example, determining that the item within the bounding box satisfies the occlusion threshold includes applying the first CNN to determine an additional bounding box associated with an occlusion in the image and determining that an overlap between the bounding box and the additional bounding box satisfies the occlusion threshold. In another example, determining that the item within the bounding box satisfies the occlusion threshold includes applying an additional CNN to determine an additional bounding box associated with an occlusion in the image and determining that an overlap between the bounding box and the additional bounding box satisfies the occlusion threshold.

As further shown in FIG. 6, process 600 may include applying a second CNN to the image to determine a query image representation (block 650). For example, the controller may apply a second CNN to the image to determine a query image representation, as described herein.

In some implementations, applying the first CNN may include transmitting the image to a cloud service providing access to the first CNN. Similarly, applying the second CNN may include transmitting the image to a cloud service providing access to the second CNN.

As further shown in FIG. 6, process 600 may include receiving, from a database, an indication of one or more candidate items based on the query image representation (block 660). For example, the controller may receive, from a database, an indication of one or more candidate items based on the query image representation, as described herein. In one example, the one or more candidate items are selected from a set of reference feature vectors based on the query image representation. Additionally, or alternatively, the one or more candidate items are selected using a linear classifier trained on a set of reference feature vectors.

As further shown in FIG. 6, process 600 may include indicating, via a user interface, the one or more candidate items to a user (block 670). For example, the controller may indicate, via a user interface, the one or more candidate items to a user, as described above.

In some implementations, process 600 further includes receiving input associated with a selected item of the one or more candidate items and causing a transaction to be processed using the selected item.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

In the foregoing disclosure, specific embodiments have been described. However, one of ordinary skill in the art will appreciate that various modifications and changes can be made without departing from the scope of the invention as set forth in the claims below. Accordingly, the specification and figures are to be regarded in an illustrative rather than a restrictive sense, and all such modifications are intended to be included within the scope of present disclosure. Additionally, the described embodiments/examples/implementations should not be interpreted as mutually exclusive, and should instead be understood as potentially combinable if such combinations are permissive in any way. In other words, any feature disclosed in any of the aforementioned examples or implementations may be included in any of the other aforementioned examples or implementations.

As used herein, the term "component" is intended to be broadly construed as hardware, firmware, and/or a combination of hardware and software. As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, or the like) on which machine-readable instructions (e.g., code in the form of, for example, software and/or firmware) can be stored. The instructions may be stored for any suitable duration of time, such as permanently, for an extended period of time (e.g., while a program associated with the instructions is executing), or for a short period of time (e.g., while the instructions are cached, during a buffering process, or the like). Further, as used herein, each of the terms "tangible machine-readable medium," "non-transitory machine-readable medium" and "machine-readable storage device" is expressly defined to exclude propagating signals. That is, as used in any claim herein, a "tangible machine-readable medium," a "non-transitory machine-readable medium," and a "machine-readable storage device," or the like, should not be interpreted as being implemented as a propagating signal.

As used herein, satisfying a threshold may, depending on the context, refer to a value being greater than the threshold, greater than or equal to the threshold, less than the threshold, less than or equal to the threshold, equal to the threshold, not equal to the threshold, or the like.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, as used herein, relational terms such as first and second, top and bottom, or the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

The terms "a" and "an" are defined as one or more unless explicitly stated otherwise herein. Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

The abstract of the disclosure is provided to allow the reader to quickly ascertain the nature of the technical disclosure. It is submitted with the understanding that it will not be used to interpret or limit the scope or meaning of the claims. In addition, in the foregoing description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed is:

1. A method for identifying produce using image analysis, comprising:
receiving, at a controller, a trigger associated with presence of an item at a product processing zone;
capturing, via an imager having a field of view (FOV) extending at least partially over the product processing zone, an image representing the item;
applying a first convolutional neural network (CNN) to the image to determine a bounding box associated with the item;
determining that the item within the bounding box satisfies an occlusion threshold;
applying a second CNN to the image to determine a query image representation;
receiving, from a database, an indication of one or more candidate items based on the query image representation; and
indicating, via a user interface, the one or more candidate items to a user.

2. The method of claim 1, further comprising:
receiving input associated with a selected item of the one or more candidate items; and
causing a transaction to be processed using the selected item.

3. The method of claim 1, wherein receiving the trigger comprises:
receiving a trigger from a scale based on a measurement at the scale satisfying a weight threshold.

4. The method of claim 1, wherein receiving the trigger comprises:
receiving input from the user interface.

5. The method of claim 1, wherein determining that the item within the bounding box satisfies the occlusion threshold comprises:
applying the first CNN to determine an additional bounding box associated with an occlusion in the image; and
determining that an overlap between the bounding box and the additional bounding box satisfies the occlusion threshold.

6. The method of claim 1, wherein determining that the item within the bounding box satisfies the occlusion threshold comprises:
applying an additional CNN to determine an additional bounding box associated with an occlusion in the image; and
determining that an overlap between the bounding box and the additional bounding box satisfies the occlusion threshold.

7. The method of claim 1, wherein the one or more candidate items are selected from a set of reference feature vectors based on the query image representation.

8. The method of claim 1, wherein the one or more candidate items are selected using a linear classifier trained on a set of reference feature vectors.

9. The method of claim 1, wherein applying the first CNN comprises transmitting the image to a cloud service providing access to the first CNN, and applying the second CNN comprises transmitting the image to a cloud service providing access to the second CNN.

10. A device for identifying produce using image analysis, comprising:
one or more memories; and
one or more processors, communicatively coupled to the one or more memories, configured to:
receive, at the device, a trigger associated with presence of an item at a product processing zone;
capture, via an imager having a field of view (FOV) extending at least partially over the product processing zone, an image representing the item;
apply a first convolutional neural network (CNN) to the image to determine a bounding box associated with the item;
determine that the item within the bounding box satisfies an occlusion threshold;
apply a second CNN to the image to determine a query image representation;
receive, from a database, an indication of one or more candidate items based on the query image representation; and
indicate, via a user interface, the one or more candidate items to a user.

11. The device of claim 10, wherein the one or more processors are further configured to:
receive input associated with a selected item of the one or more candidate items; and
cause a transaction to be processed using the selected item.

12. The device of claim 10, wherein, to receive the trigger, the one or more processors are configured to:
receive a trigger from a scale based on a measurement at the scale satisfying a weight threshold.

13. The device of claim 10, wherein, to receive the trigger, the one or more processors are configured to:
receive input from the user interface.

14. The device of claim 10, wherein, to determine that the item within the bounding box satisfies the occlusion threshold, the one or more processors are configured to:
apply the first CNN to determine an additional bounding box associated with an occlusion in the image; and
determine that an overlap between the bounding box and the additional bounding box satisfies the occlusion threshold.

15. The device of claim 10, wherein, to determine that the item within the bounding box satisfies the occlusion threshold, the one or more processors are configured to:
apply an additional CNN to determine an additional bounding box associated with an occlusion in the image; and
determine that an overlap between the bounding box and the additional bounding box satisfies the occlusion threshold.

16. The device of claim 10, wherein the one or more candidate items are selected from a set of reference feature vectors based on the query image representation.

17. The device of claim 10, wherein the one or more candidate items are selected using a linear classifier trained on a set of reference feature vectors.

18. The device of claim 10, wherein, to apply the first CNN, the one or more processors are configured to transmit the image to a cloud service providing access to the first CNN, and to apply the second CNN, the one or more processors are configured to transmit the image to a cloud service providing access to the second CNN.

19. A non-transitory machine-readable medium storing a set of instructions, the set of instructions comprising:
one or more instructions that, when executed by one or more processors of a device, cause the device to:

receive, at the device, a trigger associated with presence of an item at a product processing zone;

capture, via an imager having a field of view (FOV) extending at least partially over the product processing zone, an image representing the item;

apply a first convolutional neural network (CNN) to the image to determine a bounding box associated with the item;

determine that the item within the bounding box satisfies an occlusion threshold;

apply a second CNN to the image to determine a query image representation;

receive, from a database, an indication of one or more candidate items based on the query image representation; and indicate, via a user interface, the one or more candidate items to a user.

20. The non-transitory machine-readable medium of claim 19, wherein the one or more instructions, when executed by the one or more processors, further cause the device to:

receive input associated with a selected item of the one or more candidate items; and cause a transaction to be processed using the selected item.

\* \* \* \* \*